Patented Feb. 26, 1924.

1,484,919

UNITED STATES PATENT OFFICE.

ARTHUR P. WITTEN, OF AKRON, OHIO.

METHOD OF MANUFACTURING COLORED RUBBER ARTICLES.

No Drawing.   Application filed April 23, 1923.   Serial No. 634,174.

*To all whom it may concern:*

Be it known that I, ARTHUR P. WITTEN, a citizen of the United States, residing at Akron, in the county of Summit and State of Ohio, have invented new and useful Improvements in Methods of Manufacturing Colored Rubber Articles, of which the following is a specification.

This invention relates to new and useful improvements in the art of manufacturing rubber articles and has particular relation to a new and improved process of coloring such articles which is especially adapted for use in the manufacture of thin rubber articles, such as rubber balloons.

Toy balloons are manufactured in a large variety of colors and many attempts have been made to produce a so-called gold colored or bronze colored balloon. All suitable bronzing liquids or pigments ordinarily used to produce a bronze color contain a large per cent of copper which when subjected to the action of sulphur turns black and these attempts have met with failure.

The primary object of this invention is to provide a new and improved process whereby a lasting bronze color may be imparted to rubber and to thereby provide means whereby toy balloons having a color resembling the color of gold may be economically produced.

It is also an object of the invention to produce a rubber balloon or other rubber article having a metallic sheen, this is particularly desirable in the manufacture of black balloons which are formed for the purpose of simulating heavy weights.

The above objects are accomplished and additional ends are attained by the process hereinafter disclosed, it being understood that changes and modifications may be made or substitutions resorted to which come within the scope of the claims hereunto appended.

In practicing my improved process, ordinary instrumentalities are employed and it is believed that the invention will be readily understood without providing drawings illustrating any particular type of apparatus.

Broadly stated, the invention consists in first thoroughly mixing powdered aluminum with raw rubber, then coloring the resultant product to produce the desired result. As the invention is particularly directed to the production of a balloon, resembling gold in color, I will proceed to a description of the steps necessary to produce that effect.

Crude rubber is first thoroughly mixed with powdered aluminum, and while this may be accomplished in any desired manner, I prefer to use an ordinary rubber milling machine to thoroughly mill the powdered aluminum into the rubber. The resultant product is then dissolved in a suitable solvent such as naphtha. A balloon form is provided and a balloon is built up thereon by successively dipping the form in the rubber solution. The balloon thus built up is then dyed yellow and subjected to vulcanization. As a modification of my improved process the balloon may be formed as above set forth, vulcanized and then dyed.

A variation of the above process may be described as follows: First powdered aluminum is thoroughly mixed with raw rubber, a suitable quantity of soluble yellow dye is then thoroughly mixed with the resultant mass. A suitable solvent is then added and the mass is reduced to solution. A balloon form is then provided and a balloon body built up thereon from said solution by the well known dipping process.

If desired, the raw rubber and aluminum powder may be thoroughly mixed, the resultant mass dissolved in a suitable solvent and an oil soluble yellow dye or other suitable yellow coloring matter added to the solution and the balloon then formed from the solution as above set forth.

While the steps above described will produce a balloon having the appearance of gold, it will be readily understood that balloons and other articles having a metallic sheen may be produced in any color by substituting a dye or other suitable coloring matter for the yellow dye above set forth.

Having thus described my process, what I claim as new and desire to secure by Letters-Patent is:—

1. That process of manufacturing a toy balloon or like article which consists in first taking a quantity of crude rubber, mixing therewith powdered aluminum, reducing the mixture to solution by adding a suitable solvent, providing a form, dipping the form in solution to build up a balloon thereon, then dyeing the article and subjecting the same to vulcanization.

2. That process of manufacturing a bronze colored toy balloon or the like which comprises, first taking a quantity of crude rubber, mixing therewith powdered aluminum, reducing the mixture to solution by adding a suitable solvent, providing a form, dipping the form in the solution to build up an article thereon, then dyeing the article with yellow coloring matter and subjecting the same to vulcanization.

3. That process of manufacturing a colored rubber article, which consists in first taking a quantity of crude rubber, mixing therewith powdered aluminum, then adding a dye, and a suitable solvent thoroughly mixed to provide a solution, providing a form, successively dipping the form in the solution until the toy balloon is built up thereon, then subjecting the same to vulcanization.

4. That process of manufacturing a bronze colored toy balloon or like article which consists in first taking a quantity of crude rubber, mixing therewith powdered aluminum, then adding a yellow dye, adding a solvent to reduce the mixture to a solution forming an article of the resultant mixture by dipping a form therein and subjecting the same to vulcanization.

5. That process of manufacturing a colored toy balloon or like article composed entirely of rubber which consists in first taking a quantity of crude rubber and mixing therewith powdered aluminum, reducing the resultant mass to solution by adding a suitable solvent; providing a form; building up an article thereon by dipping the form in the solution, subjecting the balloon to vulcanization, then dyeing the same.

6. That process of manufacturing a colored rubber toy balloon or like article which consists in first taking a quantity of crude rubber, mixing therewith powdered aluminum, reducing the resultant mass to solution by adding a suitable solvent, providing a form, building up an article thereon by dipping the form in the solution, then dyeing the article.

7. That process of manufacturing a bronze colored rubber toy balloon or like article which consists in first taking a quantity of crude rubber, mixing therewith powdered aluminum, reducing the resultant mass to solution, by adding a suitable solvent, providing a form, building up an article thereon by dipping the form in the solution, then dyeing and vulcanizing same.

8. That process of manufacturing a balloon resembling gold in color which consists in first taking a quantity of rubber, milling into the rubber a quantity of powdered aluminum, reducing the resultant mass to solution by adding a suitable solvent, adding to the solution an oil soluble yellow dye, providing a form, building up an article thereon by successively dipping the form in the solution, subjecting the article to vulcanization while on the form and removing the same therefrom.

9. That process of manufacturing a gold colored balloon which consists in first, taking a quantity of crude rubber, mixing therewith powdered aluminum, then adding to the resultant mixture an oil soluble yellow dye, reducing the resultant mixture to solution by adding a suitable solvent, providing a form; building up a balloon on the form, dipping the same in the solution and subjecting the article thus formed to vulcanization.

10. That process of manufacturing a gold colored balloon which consists in taking a quantity of crude rubber, adding a quantity of powdered aluminum and a soluble yellow dye, thoroughly mixing the same and reducing the resultant mixture to solution by adding a suitable solvent, providing a form and building up a balloon thereon by dipping the same in the solution.

11. That process of manufacturing a colored rubber toy balloon or like article which consists in first taking a quantity of crude rubber and mixing therewith powdered aluminum, reducing the resultant mass to solution by adding a suitable solvent; providing a form; building up an article thereon by dipping the form in the solution; vulcanizing the article thus formed, then dyeing the same.

In testimony whereof I have hereunto set my hand.

ARTHUR P. WITTEN.